(12) United States Patent
Intrater

(10) Patent No.: US 8,489,803 B2
(45) Date of Patent: Jul. 16, 2013

(54) EFFICIENT USE OF FLASH MEMORY IN FLASH DRIVES

(75) Inventor: Gideon David Intrater, Sunnyvale, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 442 days.

(21) Appl. No.: 12/637,322

(22) Filed: Dec. 14, 2009

(65) Prior Publication Data
US 2011/0145474 A1   Jun. 16, 2011

(51) Int. Cl.
*G06F 13/10* (2006.01)

(52) U.S. Cl.
USPC .......................................................... 711/103

(58) Field of Classification Search
None
See application file for complete search history.

(56) References Cited

U.S. PATENT DOCUMENTS

| | | | |
|---|---|---|---|
| 4,320,466 A | 3/1982 | Myers | |
| 5,404,485 A * | 4/1995 | Ban | 711/202 |
| 5,696,917 A | 12/1997 | Mills et al. | |
| 5,729,683 A | 3/1998 | Le et al. | |
| 6,026,465 A | 2/2000 | Mills et al. | |
| 6,246,634 B1 | 6/2001 | Nojima | |
| 6,385,688 B1 | 5/2002 | Mills et al. | |
| 6,457,114 B1 | 9/2002 | Paluch | |
| 6,496,940 B1 | 12/2002 | Horst et al. | |
| 6,505,283 B1 | 1/2003 | Stoney | |
| 6,564,285 B1 | 5/2003 | Mills et al. | |
| 6,948,026 B2 | 9/2005 | Keays | |
| 7,139,864 B2 | 11/2006 | Bennett et al. | |
| 7,340,581 B2 | 3/2008 | Gorobets et al. | |
| 2003/0070035 A1 | 4/2003 | Wang | |
| 2003/0163630 A1 | 8/2003 | Aasheim et al. | |
| 2004/0057316 A1 | 3/2004 | Kozakai et al. | |
| 2004/0168001 A1 * | 8/2004 | Szabelski | 710/62 |
| 2005/0005057 A1 | 1/2005 | Wang | |
| 2005/0193161 A1 | 9/2005 | Lee et al. | |
| 2006/0106969 A1 | 5/2006 | Hoogerbrugge | |
| 2007/0174533 A1 | 7/2007 | Tseng et al. | |
| 2008/0005471 A1 | 1/2008 | Ma et al. | |
| 2008/0071977 A1 | 3/2008 | Chow et al. | |
| 2009/0164700 A1 | 6/2009 | Chen et al. | |
| 2009/0292865 A1 * | 11/2009 | Hong | 711/103 |
| 2009/0327585 A1 | 12/2009 | Yeh | |
| 2010/0011137 A1 * | 1/2010 | McGowan | 710/105 |

OTHER PUBLICATIONS

Universal Serial Bus 3.0 Specification, p. 3-1, 3-2, 4-1, 4-2, Nov. 2008.*

Chiang, et al., "Partitioned Log-based Flash Memory management and adaptive cleaning," International Symposium on Consumer Electronics 2000, Dec. 5-7, 2000, pp. 7-14.

(Continued)

*Primary Examiner* — Duc Doan

(74) *Attorney, Agent, or Firm* — King & Spalding L.L.P.

(57) ABSTRACT

A data storage device having non-volatile solid state memory permits efficient access by permitting multiple pending commands from a host device. A controller in the data storage device stores information about each command from the host device, and determines which stored command, if any, is presently able to be performed based on the portion of the non-volatile memory and the type of access of the command. The data storage device provides reduced access delays, improves read/write throughput, and avoids the cost of additional memory in the data storage device, by allowing accesses to idle portions of memory to proceed, and by signaling the host device when the data storage device is able to accept data to be written to portions of the non-volatile memory already active due to a previous command.

20 Claims, 8 Drawing Sheets

OTHER PUBLICATIONS

SMIL (SmartMedia Interface Library), Software Edition, Version 1.00, Toshiba Corporation; Jul. 1, 2000, 136 pages.
Information Technology—SCSI-3 Block Commands (SBC), Revision 8c, ANSI NCITS 306-199x, American National Standard for Information Technology; Nov. 13, 1997, 141 pages.
H. Niijima, "Design of a solid-state file using flash EEPROM," IBM J. Res. Develop., vol. 39 No. 5, Sep. 1995, pp. 531-545.
JEDEC Solid State Technology Association, "JEDEC Standard: Common Flash Interface (CFI)," Publication No. JESD68.01, Sep. 2003, 21 pages.
JEDEC Solid State Technology Association, "JEDEC Publication: Common Flash Interface (CFI) ID Codes," Publication No. JEP137B, May 2004, 15 pages.
International Search Report for Application No. PCT/US2010/060284, mailed Feb. 16, 2011; 3 pages.

* cited by examiner

PRIOR ART

EFFICIENT USE OF FLASH MEMORY IN FLASH DRIVES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A "USB flash drive" is a portable, read/write, non-volatile, solid-state memory device that may be connected to and accessed over a Universal Serial Bus (USB) connection. A USB flash drive is also sometimes referred to as a "USB key", "pen drive", "Thumb Drive®", "DiskOnKey®", and "Jump Drive®". The popularity of USB flash drives has grown rapidly, as has USB flash drive capacity. A USB flash drive is a specific instance of a larger class of devices referred to as "USB mass storage devices."

The generic name of "USB flash drive" used to refer to these types of USB mass storage devices comes from the type of non-volatile, solid state memory used as the medium in which to store the data they contain. USB flash drive sizes have grown rapidly, tracking the increased density of available flash memory devices, and are currently available in memory capacities as large as 64 gigabytes. USB flash drive devices typically contain one or more flash memory devices, in addition to a media controller and a USB device controller. The media controller and USB device controller acts as an interface between the USB connection with the host device and the flash memory devices use for data storage.

A USB host device such as, for example, a laptop, notebook, netbook or desktop personal computer (PC); a personal digital assistant (PDA), a cellphone, or other intelligent device interfaces to a USB flash drive through a host controller and host driver software. The USB host controller communicates with the USB device controller in the USB flash drive over a multi-wire connection that includes power, ground, and data signals.

Flash memory is employed in USB-connected mass storage devices because of its high memory density, non-volatile storage, and relative low cost. The address space of a flash memory device is read or written in units of pages, but is erased only in units of whole blocks. Current and future flash memory devices may employ various page sizes such as pages of 528 or 2112 bytes, which are only a couple of the possible choices, and pages may include non-user information such as error correction code and address mapping information. Current block sizes range from, for example, 16 kilobytes to 256 kilobytes and future block sizes may be different, where each block encompasses a number of pages. Total flash drive device memory capacities currently range from less than 128 kilobytes to 64 gigabytes, and the flash drives may be constructed using a number of flash memory chips to achieve such capacities.

Flash memory differs from other forms of Electrically Erasable Read-Only Programmable Memory (EEPROM) in that it cannot be erased by individual memory locations. Before new information can be written into the locations of a previously used block, the entire block of the memory space must be erased. The time needed to erase a block of flash memory is typically significantly larger that write or read access times. While read access time for NAND-type flash memory devices is typically measured in nanoseconds, the amount of time needed to erase a block of flash memory prior to a write may take several milliseconds. During the period when the block of flash memory is being erased, the entire block is unavailable for read/write access. Therefore, block erase time is a significant factor that limits the ability to write data to memory in systems that employ flash memory devices. To improve the throughput of a flash drive, controller manufacturers may control a number of banks of flash memory and interleave the accesses. Mass storage devices known as "solid state disks," designed to replace magnetic disk or "hard disk" storage, may employ a "translation table" that is used to translate logical addresses to physical addresses of the blocks of flash memory, to avoid the delays in accessing blocks of flash memory that are temporarily unavailable due to the need to erase memory blocks before they are re-written. Such a table requires additional storage in the solid state disk for the translation table, in addition to the sizable amount of memory normally present for temporary buffers used to hold data waiting to be written to the flash memory array.

Flash memory has a limited life when compared to other forms of read-write memory. Many single-level cell (SLC) flash memory devices are guaranteed for at least 100,000 program/erase cycles. Frequent accesses to the same locations in memory due to, for example, operating system updates to file system data structures, however, can cause failure of flash memory devices within an unacceptably short period of time. Memory management techniques such as dynamic and static "wear-leveling" are frequently used to extend the life of flash memory devices when they may be subjected to such frequent program/erase cycles.

In an ideal situation, consecutive requests would be directed to different banks. In that case, the aggregate throughput is approximately the number of banks times the throughput of each bank. In reality, requests may come in any order and bank conflicts may arise. The existing bulk-only transport (BOT) protocol of the USB standard is an in-order protocol, in which the command phase and data phase of an earlier transaction must be finished before the command phase of the next transaction can begin. While present day flash-based solid state drives (SSDs) do include temporary storage for pending commands, conventional USB flash drives do not use on-chip buffers to hold data for commands/transactions for which the required banks are not available, and throughput for such devices is degraded. Sufficient buffer memory must then be available to store all of the data for commands waiting for access to the required banks, and the cost of such buffers becomes prohibitively expensive.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Devices, methods, and circuits supporting efficient access to flash memory in USB-connected mass storage devices commonly know as flash drives, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate in general to reading and writing of data to non-volatile memory devices. More specifically, aspects of the present invention relate to devices, systems, and methods that enable a host device such as, for example, a personal/laptop/notebook/netbook computer (PC), personal digital assistant (PDA), a mobile/cellular phone, and a desktop computer to efficiently read data from and write data to a flash memory-based, non-volatile, data storage device frequently referred to as a "flash drive," which are also known by the terms "USB key," "pen drive," "Thumb Drive®," "DiskOnKey®," and "Jump Drive®."

Although the following discussion makes frequent reference to the use of the disclosed devices and techniques in embodiments of a USB flash drive, the inventive concepts presented herein are not specifically limited only to that use, and may find application in other electronic devices known now or in the future.

The term "flash memory" is used herein to refer to any form of non-volatile, solid state memory in which addressable locations to be written must typically be erased before new data is stored, the prior contents of which must be erased in blocks comprising multiple memory addresses, rather than by erasing or overwriting individual memory addresses. While at the time of this application a number of different forms of flash memory are in use including, for example, NAND and NOR flash, and single and multilevel cell flash, the present application is not specifically limited in its use to the currently available forms of non-volatile solid state memory.

It should be noted that although this disclosure describes communication between a "host device" and a "flash drive device" using a communication path complying with a communication protocol standard referred to as the Universal Serial Bus (USB) protocol, the inventive concepts presented do not require the use of the USB protocol, and may be applicable to other non-volatile memory devices connected to other host devices using other communication means than those examples provided herein.

Figure 1:
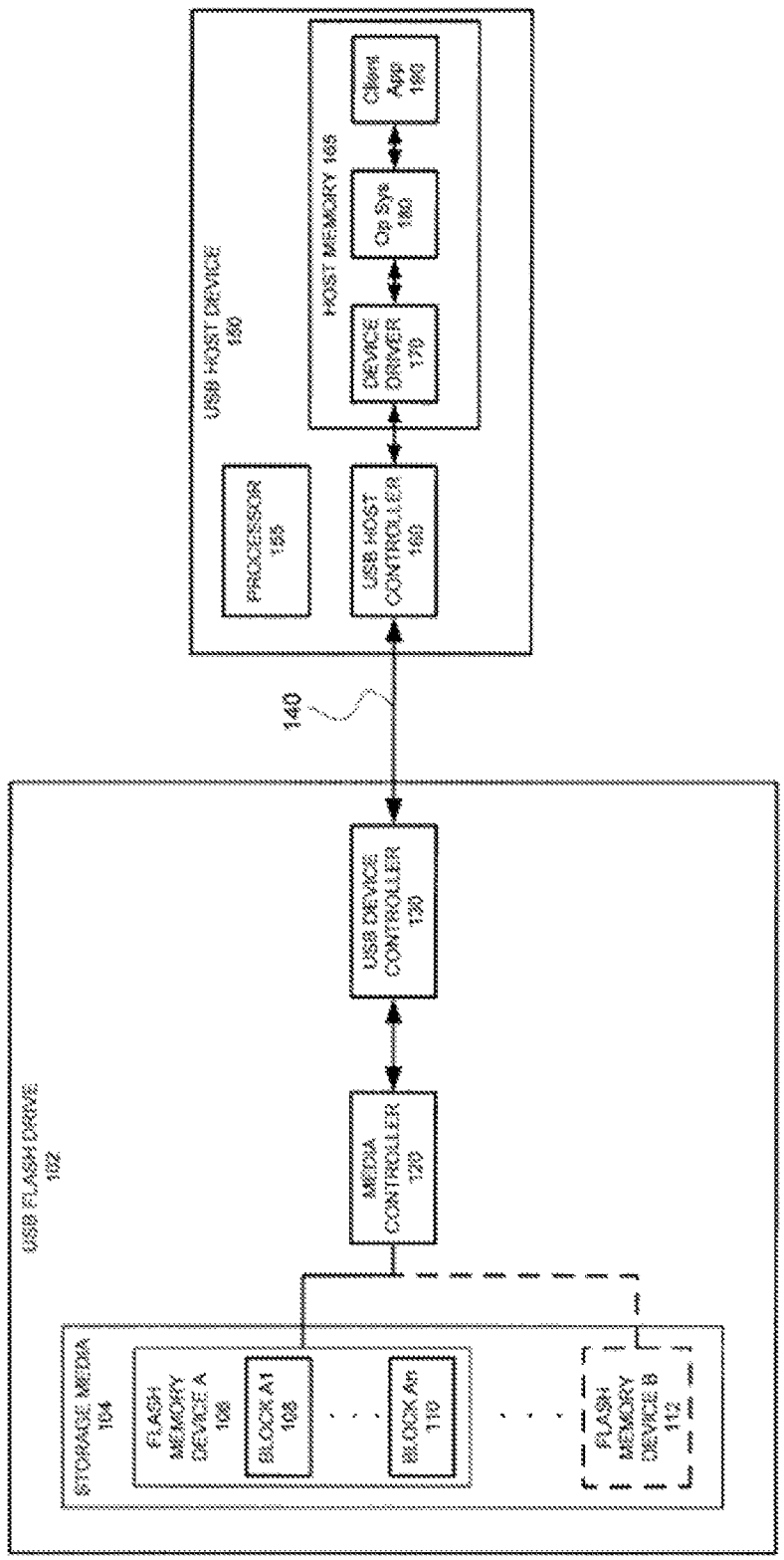
FIG. 1 is a block diagram showing an exemplary prior art USB flash drive device connected by a USB link to a USB host device.

FIG. 1 is a block diagram showing an exemplary prior art USB flash drive device 102 connected by a USB link 140 to a USB host device 150. The USB host device 150 of FIG. 1 comprises processor 155, a USB host controller 160, and a host memory 165 comprising a device driver 170, an operating system (OS) 180, and a client application 190. The processor 155 performs the executable code of client application 190, which calls upon services provided by the operating system (OS). Those services include access to stored data and executable code in the host memory 155 and other devices connected to the host device 150, such as the USB flash drive 102. Access to the USB flash drive 102 is enabled by the USB controller 160, which is controlled by the executable code of the device driver 170.

As shown in FIG. 1, the USB flash drive device 102 comprises storage media 104 that includes flash memory devices A 106 and B 112. The flash memory devices A 106 and B 112 may be any suitable flash memory device including, for example, single or multi-level NAND flash memory, or other suitable solid state, non-volatile memory having similar read/write characteristics. The address space of each of the flash memory devices A 106 and B 112 is partitioned into a number of what are referred to as "pages" (not shown), for the purposes of reading and writing, and organized into a smaller number of larger portions of the address space in what are known as "blocks," for the purpose of erasing prior written memory contents. As previously described, flash memory is so named, due to the requirement that non-volatile cells storing data must be erased, as a "flash" operation on all of the cells in a block, before new data is written, instead of simply overwriting the cells with the new data. At the time of the time of filing of this patent application, the block size of typical flash memory devices ranged from 16 kilobytes to 256 kilobytes, while the page size may be, for example, 528 or 2112 bytes.

FIG. 1 illustrates further detail of the flash memory device A 106, which as shown is organized into two or more blocks of the address space of flash memory device A, illustrated in FIG. 1 as block A1 108 and block An 110. Although flash memory device A 106 is shown as having only two blocks A1 108 and An 110, the flash memory device A 106 may have a greater or lesser number of blocks. Flash memory device B 112 may, but need not be arranged similar to the configuration shown for flash memory device A 106.

The USB flash drive device 102 of FIG. 1 also comprises a media controller 120. The media controller 120 manages the operation of the flash memory devices A 106 and B 112 and interfaces to a USB device controller 130. Management of the flash memory devices A 106 and B 112 may include a number of functions. Such functions include, for example, the mapping of address information received from the USB host device 150 to a corresponding location in the storage architecture of the particular flash memory devices of the storage media 102. Address information sent to the flash memory devices A 106 and B 112 by the media controller 120 may be represented as either physical addresses (e.g., block and page), or may use a logical block address (LBA) scheme, depending upon the nature of the flash memory devices A 106 and B 112.

In addition to the above, the media controller 120 may support the generation and decoding of error correction codes (ECC) used to detect and correct errors in the data stored to and read from the flash memory devices A 106 and B 112. The media controller 120 of FIG. 1 may also perform mappings of defective portions of the flash memory devices A 106 and B 112 of the storage media 104 to other portions of the flash memory reserved as replacement storage. Further, the media controller 120 may have functionality that enables "wear-leveling" to overcome the rather limited number of writes that may be performed to any one location of the flash memory devices A 106 and B 112, thereby extending the effective life of the flash memory devices A 106 and B 112. Although illustrated in FIG. 1 as separate and distinct from the storage media 104, the media controller 120 may be integrated with the storage media 104 on a single integrated circuit or module.

The USB device controller 130 shown in FIG. 1 represents the interface circuitry that transmits electrical signals onto and receives electrical signals from the USB link 140, in accordance with the USB protocol standard in use. The USB device controller 130 interfaces with the USB link 140 and the media controller 120, passing commands and data received from the USB host device 150 to the media controller 120, and sending status information and data from the media controller 120 to the USB host device 150. Although shown as separate elements, the storage media 104, media controller 120, and USB device controller 130 may be combined in various sub-combinations or into a single functional device. Further, the USB media controller 120 and USB device controller 130 may be implemented as hardware, or as a combination of hardware and software/firmware. The USB flash device 102 may be powered from the USB link 140 or may be self powered.

The USB link 140 may be compliant with the full-speed, hi-speed, or super-speed USB protocol requirements. Additional details of the Universal Serial Bus standards are available from the USB Implementers Forum (USB-IF) (http://www.usb.org). While merely shown as a line representing an electrical connection comprising the power, ground, and data signals of the USB standard, the USB link 140 may also comprise one or more elements referred to as "hubs" that are used to provide access to USB host device 150 by a plurality of USB compatible devices, including USB mass storage devices such as the USB flash device 102 shown in FIG. 1.

The USB host controller 160 of FIG. 1 represents the interface circuitry that transmits electrical signals onto and receives electrical signals from the USB link 140, in accordance with the USB protocol standard. The device driver 170 represents executable code that interfaces between the interface circuitry of the USB host controller 160 and the OS 180 to allow the executable code of client application 190 and the OS 180 of the USB host device 150 to communicate with the USB flash memory device 102 over the USB link 140. The client application 190 in the USB host device 150 represents executable application code (in contrast to operating system or device driver code) that accesses the storage media 104 using file-type operations or system calls supported by the OS 180 and device driver 190. Although FIG. 1 illustrates a client application 190 running on an operating system 180, where the client application 190 communicates through the OS 180 and device driver 170 with the USB host controller 160, other configurations that combine or divide the functionality in a different manner may be seen.

As previously discussed, a USB flash drive device such as the USB flash drive device 102 of FIG. 1 belongs to the class of USB devices referred to as USB mass storage devices. Prior art USB mass storage devices such as USB flash drive 102 communicate with a USB host device such as the USB host device 150 using the bulk-only-transport (BOT) protocol defined by the USB Standard. Also as previously discussed, the bulk-only-transport protocol used by prior art USB flash drive devices such as USB flash drive device 102 permits a USB host device such as USB host device 150 to have only a single outstanding command pending on the USB flash drive device 102. This limitation of the prior art forces the USB host device 150 to wait each time a write affects an un-erased block of the storage media 102. The block erasure delay can significantly slow both write and read access to the USB flash drive device 102, depending upon the block size of the flash memory devices used in the storage media 104, and the amount of data to be written. Read access is also delayed both due to the limitation of the bulk-only-transport protocol used in communicating over the USB link 140 that permits only a single outstanding command, and to delays in accessing other portions of blocks of storage media 102 undergoing erasure.

Figure 2:
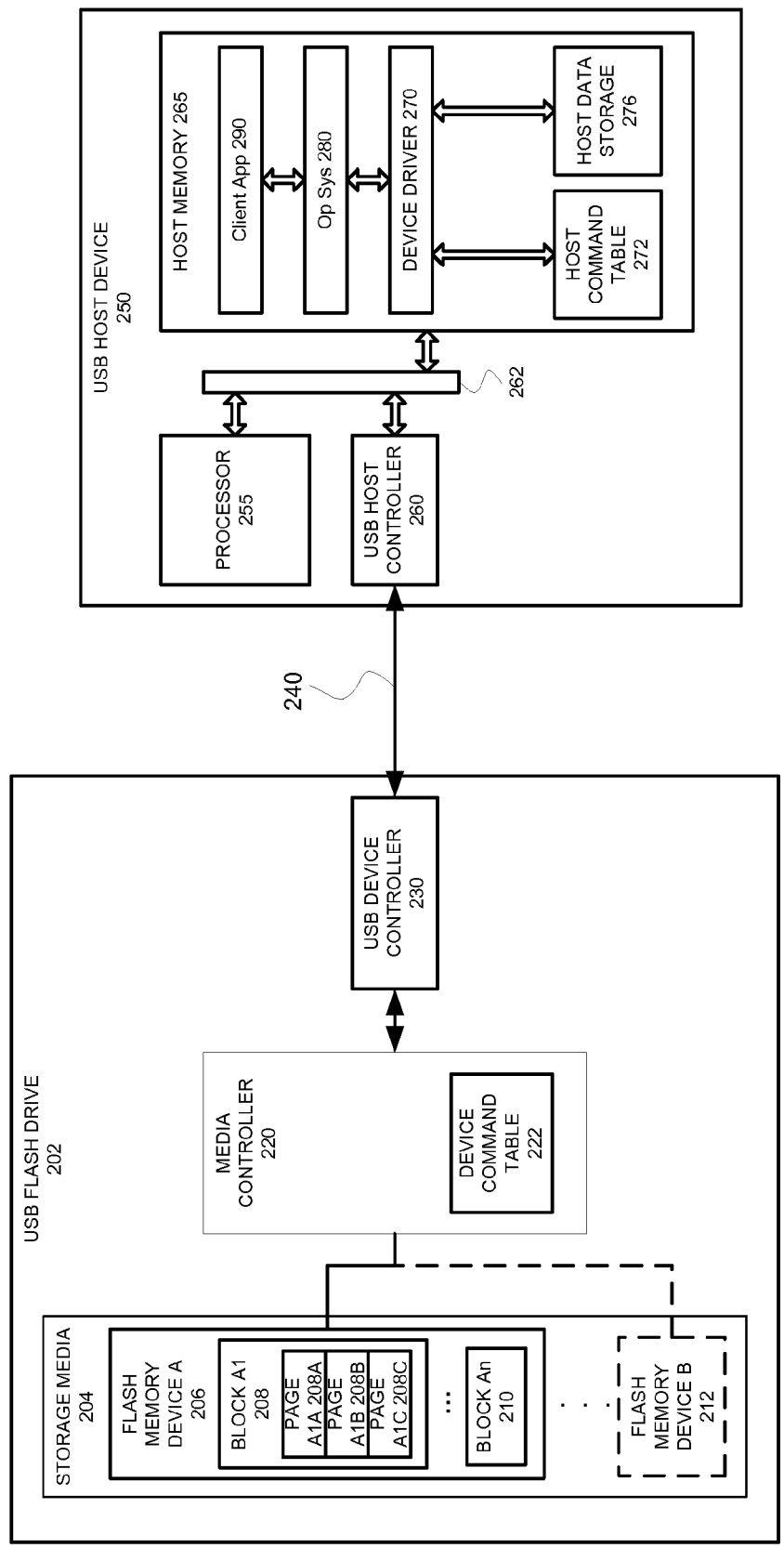
FIG. 2 is a block diagram showing an exemplary USB flash drive device connected by a USB link to a USB host device in which operation of the USB flash drive device and USB host device support efficient access to the flash memory capacity of the USB flash drive device, in accordance with a representative embodiment of the present invention.

FIG. 2 is a block diagram showing an exemplary USB flash drive device 202 connected by a USB link 240 to a USB host device 250 in which operation of the USB flash drive device 202 and USB host device 250 support efficient access to the flash memory capacity of the USB flash drive device 202, in accordance with a representative embodiment of the present invention. The USB host device 250 of FIG. 2 comprises processor 255, a USB host controller 260, and a host memory 265 comprising a device driver 270, an operating system (OS) 280, and a client application 290. It should be noted that although shown in FIG. 2, the use of the OS 280 is not a specific limitation of the present invention. The processor 255, which may comprise any suitable central processing unit, microprocessor, or microcomputer from manufacturers such as Intel, Advanced Micro Devices, Freescale, or other manufacturers. The processor 255 performs the executable code of client application 290, which calls upon services provided by the operating system (OS) 280. The services provided by operating system 280 may include access to stored data and executable code in the host memory 255 and to other devices connected to the USB host device 250, such as the USB flash drive 202. Access to the USB link 240, and therefore, the USB flash drive 202, by the USB host device 250, is enabled by the USB host controller 260, which is supervised by the processor 255 over an interconnect bus such as bus 262, while performing the executable code of the device driver 270. In one representative embodiment of the present invention, the processor 255 may directly control all actions of the USB host controller 260, transferring commands, parameters, and/or data to/from the USB host controller 260 from/to the processor 255 and host memory 265. In other representative embodiments, the processor 255 may place commands, parameters, and/or data in locations in the host memory 255 and direct the USB host controller 260 to begin processing the commands, parameters, and/or data stored in identified locations in the host memory 265 using direct memory access (DMA) by the USB host controller 260 to the host memory 255.

The USB flash drive device 202 of FIG. 2 comprises storage media 204, media controller 220, and USB device controller 230. The illustration of FIG. 2 shows that the storage media 204 of the USB flash drive device 202 comprises flash memory devices A 206 and B 212. FIG. 2 also shows that flash memory device A 206 is organized into two or more blocks of the address space of flash memory device A 206, illustrated in FIG. 2 as having block A1 208 and block An 210. The flash memory devices A 206 and B 212 of the storage media 204 may, for example, be of the same type and arrangement as the flash memory devices A 106 and B 112 of FIG. 1. Although flash memory device A 206 is shown in FIG. 2 as having only two blocks A1 208 and An 210, this does not represent a specific limitation of the present invention, as the flash memory device A 206 may have a greater number of blocks. Flash memory device B 212 may but need not be arranged in the same manner shown for flash memory device A 206.

The illustration of FIG. 2 also shows that each block of the flash memory device such as block A1 208 of flash memory device A 206 may encompass multiple pages of memory space, illustrated in FIG. 2 as page A1A 208A, page A1B 208B, and page A1C 208C. Although not shown, the address space of memory block An 210 of flash memory device 206 is organized in a similar manner. At the time of the time of filing of this patent application, the block size of available flash memory devices ranged from 16 kilobytes to 256 kilobytes, while the page size may be just 528 or 2112 bytes. The memory architecture, including the particular block or page sizes of any flash memory device discussed above, do not represent a specific limitation of the present invention, as the inventive concepts disclosed herein are applicable to flash memories having different sized blocks and pages.

As shown in exemplary embodiment of FIG. 2, a USB flash drive device of a representative embodiment of the present invention, such as the USB flash drive device 202, also comprise a media controller 220. Like the media controller 120 of FIG. 1, the media controller 220 of FIG. 2 may provide functionality for managing the operation of the flash memory devices A 206 and B 212, and for communicating with the USB device controller 230. In a representative embodiment of the present invention, the media controller 220 may, for example, include such functionality to, for example, map address information received from the USB host device 250 to that needed by the storage architecture of the particular flash memory devices of the storage media 202, which as discussed above may be in the form of, for example, a physical address or a logical block address, according to the needs of flash memory devices A 206 and B 212.

A media controller in a representative embodiment of the present invention, such as the media controller 220 of FIG. 2, for example, may also support the use of error correction codes to detect and correct errors in the data stored in the storage media 204, as previously discussed. In addition, the media controller 220 may support mapping of defective portions of the storage media 204 to other portions reserved as replacement storage, and may function to minimize the effects of write and erase operations upon the life of flash memory devices that make up the media storage 204, such as the flash memory devices A 206 and B 212 of FIG. 2 using, for example, a dynamic or static a "wear-leveling" technique. In a representative embodiment of the present invention, the storage media 204 and the media controller 220 may be integrated to form a single device, and need not be separate elements as illustrated in FIG. 2.

As illustrated in FIG. 2, a USB flash drive device in a representative embodiment of the present invention also comprises a USB device controller, represented in FIG. 2 as USB device controller 230. The USB device controller 230 of FIG. 2 is similar in many ways to the USB device controller 130 of FIG. 1, in that it also acts as an interface between the USB link 240 and the media controller 220. In that role, the USB device controller 230 may pass commands and data from the USB host device 250 to the media controller 220, and status information and data from the media controller 220 to the USB host device 250. Again, although shown as separate elements, the functionality of the storage media 204, media controller 220, and USB device controller 230 may be combined in various sub-combinations, including providing all functionality within a single device, without departing from the scope of the present invention. Further, the USB media controller 220 and USB device controller 230 of FIG. 2 may be realized as hardware, or as a combination of hardware and software/firmware, and may be powered from the USB link 240 or by a power source within or separately connected to the USB flash drive device 202. Additional functionality specific to a media controller and USB device controller in accordance with a representative embodiment of the present invention will be discussed in detail below.

The illustration of FIG. 2 also includes a USB link 240 that connects the USB flash drive device 202 to the USB host device 250. The USB link of a representative embodiment of the present invention, such as the USB link 240, may operate according to the full-speed, hi-speed, or super-speed USB protocol requirements, as supported by the USB link 140 of FIG. 1. Also as in the USB link 140, the USB link 240 of FIG. 2 may comprise one or more elements referred to as "hubs" that permit access to USB host device 250 by other USB compatible devices.

The representative embodiment of the present invention shown in FIG. 2 also includes a USB host device 250. The USB host device 250 is similar in many ways to the USB host controller 150 of FIG. 1, in that the USB host controller 250 comprises a USB host controller 260, a device driver 270, an operating system (OS) 280, and a client application 290, which provides many of the functions provided by the USB host controller 160, device driver 170, operating system (OS) 180, and client application 190, respectively, of FIG. 1.

The USB host controller 260 of FIG. 2 represents interface circuitry that transmits electrical signals onto and receives electrical signals over the USB link 240 from the USB device controller 230 of the USB flash drive device 202, in accordance with the USB protocol standard in use. Additional details of the functionality of USB host controller 260 are provided below.

In a representative embodiment of the present invention, a device driver such as the device driver 270 represents executable code and data used to communicate control and status information and data between the interface circuitry of the USB host controller 260, and the client application 290 and OS 280. This executable code and data of device driver 270 enables the client application 290 of the USB host device 250 to communicate through the OS 280 with the USB flash memory device 202 over the USB link 240. In a representative embodiment of the present invention, the elements of the USB host device 250 include additional novel capabilities that cooperate with the unique functionality of the flash memory device 202, which will now be described in detail.

The media controller 220 and the USB device controller 230 of the flash drive device 202 in a representative embodiment of the present invention work in cooperation with the USB host controller 260 and the device driver 270 of the USB host device 250 to reduce access delays and improve data transfer efficiency. This is done, in part, by minimizing the impact of the previously discussed delays in accessing flash memory devices caused by block erase operations that periodically occur during write accesses to the storage media 204 of the USB flash drive device 202 of FIG. 2, and intelligently overlapping accesses to separate portions of the flash memory device that make up the storage media of the USB flash drive device 202.

In a representative embodiment of the present invention, the USB host device 250 employs memory or storage, shown in FIG. 2 as host command table 272, which is used to hold command information (e.g., command identifier information, access type information, and address information) associated with pending accesses to the storage media 204 of the USB flash drive device 202. The host command table 272 is used by the device driver 270 to store the command information (e.g., command identifier information, access type information, and address information) transmitted to the USB flash drive device 202 by the USB host device 250. Additional details of the host command table 272 are discussed below with respect to FIG. 3. In addition to the host command table 272, the USB host device 250 also comprises data memory or storage, shown in FIG. 2 as host data storage 276, to temporarily hold data destined for storage in the storage media 204 of the USB flash drive device 202, shown in the illustration of FIG. 2 as flash memory devices A 206 and B 212.

As shown in the illustration of FIG. 2, a media controller of a representative embodiment of the present invention, such as the media controller 220 of FIG. 2, employs a memory or storage shown in FIG. 2 as the device command table 222, which is used to hold command information (e.g., command identifier information, access type information, and address information) associated with pending accesses to the storage media 204. Command information extracted from command messages sent by the USB host device 250 to access the USB flash drive 202 is stored in the device command table 222 for use by the media controller 220. Although the device command table 222 is shown in FIG. 2 as a part of media controller 220, it should be noted that the device command table 222 may also reside in the USB flash drive 202 as a separate memory device and be accessible to the media controller 220. Additional details of the device command table 222 are discussed below with reference to FIG. 4. It should again be noted that the functionality of the storage media 204, media controller 220, device command table 222, and USB device controller 230 may be arranged in various sub-combinations, or as a single element, without departing from the spirit or scope of the present invention.

As previously discussed, the bulk-only transport (BOT) protocol used by prior art USB mass storage devices allows only a single read or write command from a USB host device to be pending at any time. That is, a new command cannot be sent by a USB host device to access a USB mass storage device until a previously issued command to that USB mass storage device has been completed. As also discussed above, flash-memory based, non-volatile memory devices require a substantially greater amount of time to write data than to read data, if the portion of the flash memory device being written to must first be erased. Each re-write of a memory location in a flash memory device requires that the block of memory containing that location must be in an erased condition at the time the write is performed. In addition, no further access is allowed to a memory block undergoing erasure, reading, or writing until any prior erase, read, or write operation on the block of memory is completed. Thus, additional operations upon any locations in a block of flash memory, including both read and write operations, must wait until the erasure of the affected block is completed. The single-command-at-a-time limitation of the bulk-only transport protocol, coupled with the relatively long erase times and the block erase nature of flash-type memory combine to significantly limit the speed with which USB mass storage devices such as prior art USB flash drive devices can be accessed.

To overcome the single-command-at-a-time shortcoming of the bulk-only transport protocol previously used, a representative embodiment of the present invention employs an innovative arrangement of hardware and software that enables cooperation between a USB flash device and USB host device to permit multiple commands to be pending for a USB flash device. In a representative embodiment of the present invention, a USB device controller such as the USB device controller 230 of FIG. 2 may interact with a media controller such as the media controller 220 to enable a flash drive device to store multiple pending read and/or write commands, and to then complete each stored command when the portion of flash non-volatile memory to be read or written is available to perform the requested read or write operation.

In a representative embodiment of the present invention, an application program or operating system in a USB host device such as the client application 290 and/or OS 280 of USB host device 250 of FIG. 2 may wish to read or write data from/to a USB flash drive device such as, for example, the USB flash drive device 202 of FIG. 2. The client application 290 and/or OS 280 communicate with the USB flash drive device 202 through device driver executable code specific to handling such accesses, illustrated in FIG. 2 as the device driver 270. The code of device driver 270 is executed by the processor 255 and interfaces between the client application 290 and OS 280, and the USB host controller 260 to, pass requests to read or write data from/to the USB flash drive device 202, and to pass back to the client application 290 and/or OS 280 the results of such requests received from the USB flash drive device 202.

In a representative embodiment of the present invention, the client application 290 or operating system 280 in the USB host device 250 may wish to read data from or write data to the USB flash drive device 202, and may execute code that performs a function or system call to the device driver 270 of FIG. 2. In a representative embodiment of the present invention, the device driver 270 assigns a unique identifier to be associated with a command parameter representing the requested "read" or "write" access. That unique identifier is referred to herein as a "command identifier."

In one representative embodiment of the present invention, the "read" command issued by the USB host device 250 to the USB flash drive device 202 may be encoded as, for example, one or more of the Small Computer Systems Interface (SCSI) "READ(6)," "READ(10)," "READ(12)," and "READ(16)" commands as described in "SCSI Block Commands-2 (SBC-2)", available as document "T10/1417-D" that is produced by the T10 Technical Committee of the "International Committee on Information Technology Standards (INCITS)". In such a representative embodiment, the "write" commands issued by the USB host device 250 to the USB flash drive device 202 may be, for example, one or more of the SCSI "WRITE(6)," "WRITE(10)," "WRITE(12)," and "WRITE(16)" commands also described in the "SBC-2" document "T10/1417-D." Document "T10/1417-D" can be found at http://www.t10.org/. Although commands from the above-identified "SBC-2" document of the T10 Technical Committee have been used to illustrate a representative embodiment of the present invention, those commands do not represent a specific limitation of the present invention, as other suitable command encodings may be employed without departing from the spirit and scope of the present invention.

In a representative embodiment of the present invention, the USB host device 250 stores a "command" or "access type" parameter representing the requested "read" or "write" command, the associated "command identifier," and other parameters, into a portion of the host memory 265 of the USB host device 250, shown in FIG. 2 as host command table 272. If the command issued to the USB flash drive device 202 is a command to write data to the storage media 204, the USB host device 250 of FIG. 2 stores a copy of the data to be written to the USB flash drive device into an area of the host memory 265 of the USB host device 250, shown in FIG. 2 as host data storage 276. A representative embodiment of the present invention temporarily buffers data to be written to the USB flash drive device 202 at the host device 250, to avoid imposing a cost and space burden upon the flash drive device 202 for the data storage components needed. This is in contrast to many presently available mass storage devices such as, for example, conventional hard disk drives and more recently introduced flash-based, solid state drives, which contain buffers typically ranging in size from 8 to 32 megabytes. As will be shown in greater detail below, a representative embodiment of the present invention uses the larger memory resources of the host memory 265 of the USB host device 250 to eliminate the need to have additional storage, and cost, in the flash drive device 202 while also improving the speed of operation of the flash drive device 202.

In a representative embodiment of the present invention, the USB host device 250 then transmits the command information for the access to be performed at the USB flash drive device 202 including, for example, the command identifier information, access type information, and address information identifying the portion of the storage media 204 of the USB flash drive device 202 to be accessed, to the USB flash drive device 202 using, for example, a serial communication protocol such as, for example, that defined by the USB 3.0 protocol specification. The USB 3.0 protocol specification has been developed by the USB Implementers Forum (USB-IF), Inc., and details of the USB 3.0 protocol specification can be found at http://www.usb.org. Although frequent reference is made herein to the USB 3.0 protocol specification for communication of commands, data, and other information between the USB host device 250 and USB flash drive device 202 of FIG. 2, this is not a specific limitation of the present invention, as other suitable protocols may be employed without departing from the spirit and scope of the present invention.

Figure 3:
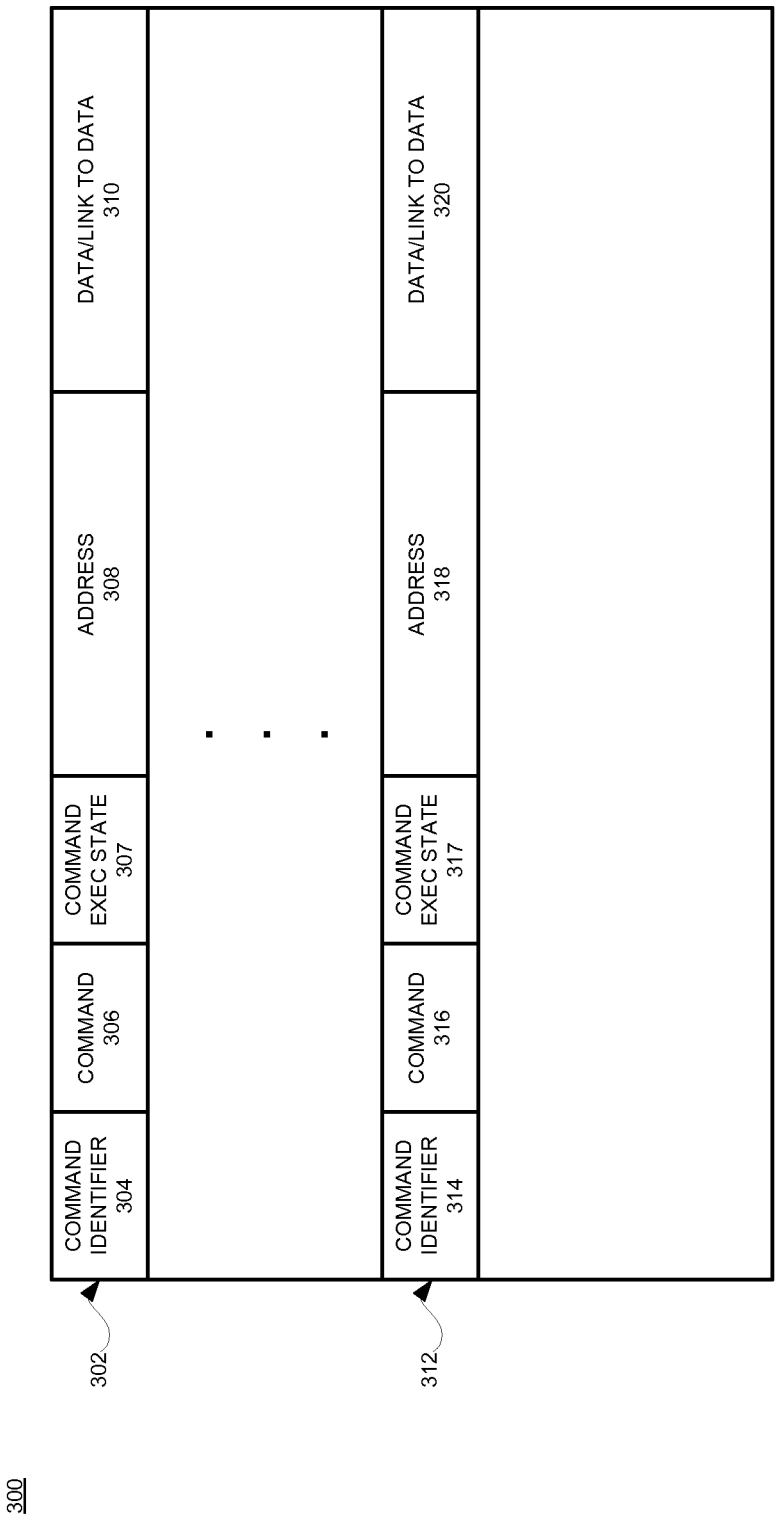
FIG. 3 is an illustration of an exemplary host command table 300 that may correspond to, for example, the host command table of FIG. 2, in accordance with a representative embodiment of the present invention.

FIG. 3 is an illustration of an exemplary host command table 300 that may correspond to, for example, the host command table 272 of FIG. 2, in accordance with a representative embodiment of the present invention. As is illustrated in FIG. 3, a host command table 300 in accordance with a representative embodiment of the present invention may comprise a number of what are referred herein as "command entries," illustrated in FIG. 3 by the command entries 302, 312. Command entries of the host command table 300 are used to associate a command identifier, a "command" or "access type", a command execution state, an address, and data used for the completion of a command or access to the USB flash drive device 202. It should be noted that although only the two command entries 302, 312 are shown in FIG. 3, that aspect of FIG. 3 does not represent a specific limitation of the present invention, as a host command table of a representative embodiment of the present invention may contain zero or more entries at any point in time, depending upon the number of commands awaiting completion by a USB device such as, for example, the USB flash drive device 202 of FIG. 2. The maximum size of the host command table may depend, for example, upon the amount of memory available in the USB host device 250, or upon the nature of the protocols used to communicate the command information from the client application 290, OS 280, and/or device driver 270 of the USB host device 250 to the media controller 220 and USB device controller 230 of the USB flash drive device 202. In a representative embodiment of the present invention, the size of the host command table 272 may be sufficient, for example, to contain command information for 32 pending commands or accesses to the USB flash drive device 202. It should be noted, however, that the number of allowable pending commands or accesses is not a specific limitation of the present invention, and may be greater or less than that discussed above without departing from the spirit and scope of the present invention.

As illustrated in FIG. 3, a command entry such as, for example, the command entry 302 in the host command table 272 comprises a command identifier field 304, a command field 306, a command exec state 307, an address field 308, and a data/link to data field 310. Although each command entry 302, 312 in the illustration of FIG. 3 has five fields arranged as shown, these features of FIG. 3 do not represent specific limitations of the present invention, as a different type of data structure, a different number of fields, a different arrangement of fields, and differently named fields may be employed without departing from the spirit and scope of the present invention.

In a representative embodiment of the present invention, the command identifier fields 304, 314 contain a unique identifying value assigned by the USB host device 250 to each of the active command entries of the host command table 300. The command identifier fields 304,314 uniquely identify each of the command entries 302, 312 in the host command table 300 for the period from issuance by the USB host device 250 of the associated commands to the USB flash drive device 202, until notification of the USB host device 250 of the completion of the associated commands of the command fields 306, 316 by the USB flash drive 202.

The command fields 306, 316 of FIG. 3 represent the type of access to be performed and may be, for example, a bit field to contain an integer, an arbitrary bit encoding, an ASCII character, a command encoding such as that defined by a standards specification such as the document titled "SCSI Block Commands-2 (SBC-2)", available as document "T10/1417-D", produced by the T10 Technical Committee of the "International Committee on Information Technology Standards (INCITS)," and previously mentioned above, or other suitable value to represent, at least, the "read" and "write" commands to be sent to the USB flash drive device 202. In a representative embodiment of the present invention, commands for accesses by the client application 290 and/or OS 280 may be translated to an alternate form, such as from the SCSI commands discussed above, to AT attachment messaging using SCSI to ATA translation layer functionality such as that defined in the document titled "SCSI/ATA Translation-2

(SAT-2)", identified as document "T10/1826D" produced by the T10 Technical Committee of the "International Committee on Information Technology Standards (INCITS)."

The command exec state field 307, 317 of FIG. 3 may represent, for example, the current state of execution of the command indicated by the command field 306, 316, and may be stored as, for example, an unsigned integer or collection of bits suitable to represent one of a number of states of execution of the requested command. The USB host device 250 may use the command exec state field 307, 317, for example, to track the progress of the associated command according to status information received from the USB flash drive device 202. For example, the command exec state field 307, 317 may be set to a value representing "SENT", following transmission of the associated command to the USB flash drive device 202 by the USB host device 250. The value of the command exec state field 307, 317 may then be set to indicate a value representing "ACTIVE," once the USB host device 250 detects that the USB flash drive device 202 is acting upon the previously requested command, and may subsequently be set to a value representing "COMPLETE," when the USB host device 250 determines that the associated command has been completed. A command entry having a command execution state of "COMPLETE" may then be reused when making a later access request to the USB flash drive device 222.

Although only three representative command execution states have been described above, this is for reasons of clarity, as a different number, or a different set of command execution states may be employed without departing from the spirit and scope of the present invention. It should also be noted that the command execution states tracked in the USB host device 250 may, but need not be, the same as those used by the USB flash drive device 202 and tracked in the USB device command table 222, which is described below with respect to the device command table 400 of FIG. 4. It should also be noted that the host command table 300 of FIG. 3 need not be arranged in memory as shown, but may be implemented out of multiple smaller tables or equivalent representations of similar data, without departing from the spirit and scope of the present invention.

The address field 308 may represent, for example, an address of a portion of the storage media 204 of the USB flash drive device 202, and may be stored as, for example, an unsigned integer or collection of bits suitable to represent an address within the storage media 204 from/to which data is to be read/written. The address represented in the address field 308 may comprise, for example, a "logical block address" or other format of address information suitable for addressing the portion of memory in the storage media 204 of the USB flash drive device 202 to be accessed.

The data/link to data field 310 in a representative embodiment of the present invention is populated for each of the command entries 302, 312 whose command field 306, 316 represents a "write" command. In one representative embodiment of the present invention, the data/link to data fields 310, 320 of command entries containing a "write" command in command fields 306, 316 may comprise sufficient storage space to hold the actual data to be written by the "write" command to the corresponding portion of storage media 204 of the USB flash drive device 202. In such an embodiment, the data to be written to the USB flash drive device 202 may be stored directly into the data/link to data field 308 when a command entry is populated. In other representative embodiments, the data/link to data field 310 may comprise a suitable reference, link, or pointer to identify an area of the host memory 265, separate from the host command table 300, where the actual data to be written is temporarily stored before being transmitted to the USB flash drive device 202. A representative embodiment of the present invention may employ other storage schemes to associate the actual data to be written to the USB flash drive device 202 with, for example, the command identifier fields 306, 316, command fields 308, 318, and address fields 310, 320 of one of the command entries 302, 312, without departing from the spirit and scope of the present invention.

Figure 4:
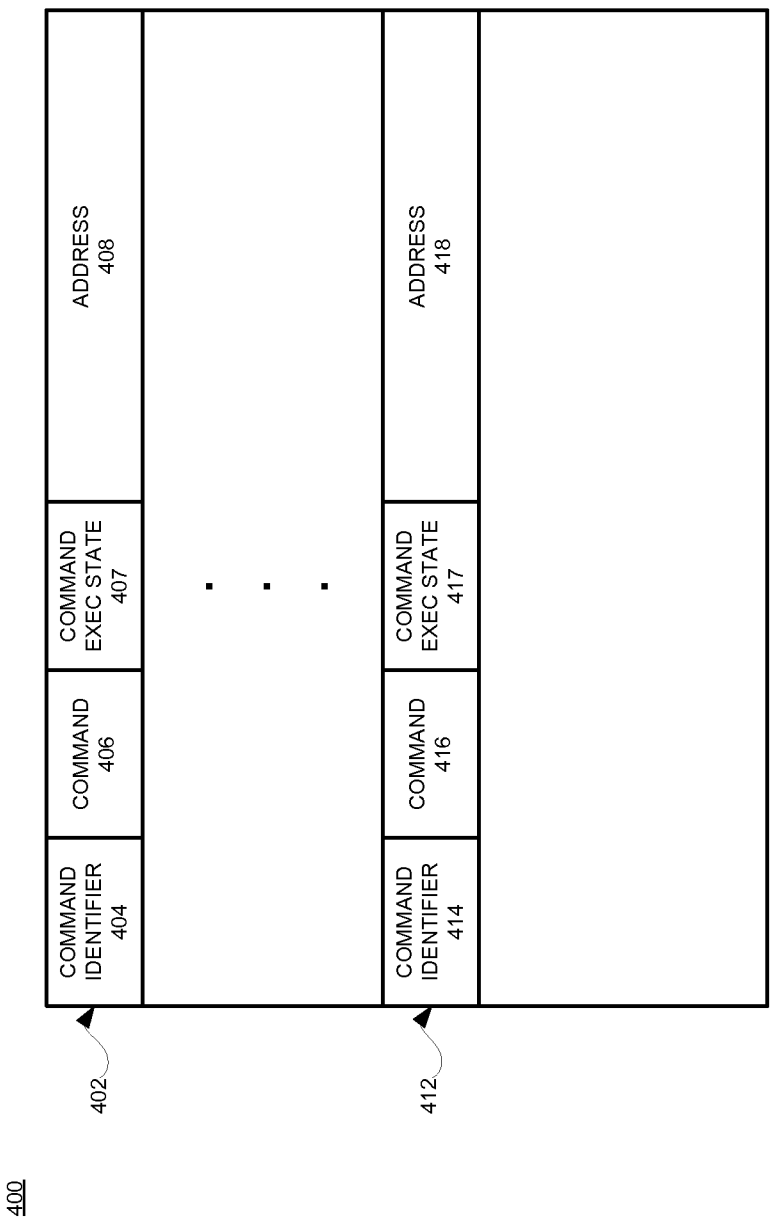
FIG. 4 is an illustration of an exemplary device command table that may correspond to, for example, the device command table of FIG. 2, in accordance with a representative embodiment of the present invention.

FIG. 4 is an illustration of an exemplary device command table 400 that may correspond to, for example, the device command table 222 of FIG. 2, in accordance with a representative embodiment of the present invention. As is illustrated in FIG. 4, a device command table 400 in accordance with a representative embodiment of the present invention may comprise a number of command entries, illustrated in FIG. 4 by the command entries 402, 412. Command entries 402, 412 of the device command table 400 are used to temporarily store command information comprising a command identifier, a command or access type, a command execution state, and an address of the portion of storage media 204, sent from the host device 250, to be used in the completion of a command at the USB flash drive device 202.

As in the case of the host command table 272, it should be noted that although only the two command entries 402, 412 are shown in FIG. 4, this is for reasons of clarity, as a device command table having a different number of command entries may be employed, without departing from the spirit and scope of the present invention. It should also be noted that a device command table of a representative embodiment of the present invention may contain zero or more entries at any point in time, depending upon the number of commands awaiting completion by a USB flash drive device such as, for example, the USB flash drive device 202 of FIG. 2. In a representative embodiment of the present invention, the size of the device command table 222 may be sufficient, for example, to include command information for 32 pending commands or accesses to the USB flash drive device 202. It should be noted, however, that the number of allowable pending commands or accesses is not a specific limitation of the present invention, and may be greater or less than that discussed above without departing from the spirit and scope of the present invention.

As illustrated in FIG. 4, a command entry such as, for example, the command entries 402, 412 in the device command table 222 each comprise a command identifier field 404, 414, a command field 406, 416, a command exec state field 407, 417, and an address field 408, 418. Although each command entry 402, 412 in the illustration of FIG. 4 has only four fields arranged as shown, these features of FIG. 4 do not represent specific limitations of the present invention, as a different type of data structure, a different number of fields, a different arrangement of fields, and differently named fields, consistent with the command information stored in the host command table 272 and sent to the USB flash drive device 202 by the USB host device 250.

In a representative embodiment of the present invention, the command identifier field 404, the command field 406, and the address field 408 of an unused command entry such as the command entry 402 of the device command table 400 are used to store the values of the command identifier field 304, command field 306, and address field 308 of a corresponding command entry of the host command table 300, sent by the USB host device 250 to the USB flash drive device 202 via the USB link 240. The values stored in the command entry 402 by the USB flash drive device 202 are sent to the USB flash drive device 202 by the USB host device 250, after the USB host device 250 stores them in a corresponding command entry in the device command table 272, details of which are shown in the host command table 300 of FIG. 3. In a representative embodiment of the present invention, a command entry in the host command table 300 is populated as a result of an access (e.g., a "read" or "write") to the USB flash drive device 202 by the client application 290 and/or OA 280 of the USB host device 250. The media controller 220 and/or USB device controller 230 use the command information stored in the device command table 222 to determine which, if any, pending command entries in the device command table 222 are able to be performed by the USB flash drive device 202.

For example, a command entry, such as command entry 402, may contain a command field (e.g., command field 406) that indicates a "write" access to a portion of storage media 204 that is not in an erased state, necessitating erasure of the block that contains the addressed portion. In such a case, the erasure of the containing block of the storage media 204 must complete before the write to the portion of storage media 204 at the address indicated by address field 408 is able to proceed. The "write" access to addressed portion of the storage media 204 of the USB flash drive device 202 is then temporarily inhibited. In a representative embodiment of the present invention, the media controller 220 and USB device controller 230 may continue to receive and process command information for additional command messages from the USB host device 250, in spite of the ongoing activity related to the "write" access to the portion of storage media 204 indicated by address field 408. For example, the command field 416 of the command entry 412 may contain command information received after the "write" access of command entry 402, and may represent a "read" access to a different block or flash memory device of the storage media 204 than that currently engaged in the erase activity of the command entry 402. For example, "read" access to the portion of the storage media identified my command entry 412 may not be inhibited by the block erase activity related to command entry 402.

In such a situation, the media controller 220 and/or USB device controller 230 may send an indication to the USB host device 250 that the USB flash drive device 202 is ready to perform the "read" access of command entry 402, by transmitting, among other information, the command identifier 414 associated with the "read" access of command field 416. The USB flash drive device 202 may then perform the "read" access and send the contents of command identifier field 414 and the data read from the portion of the storage media 204 identified by the address field 418 of command entry 412 to the USB host device 250. Upon completion of the transmission of the data to the USB host device 250, the USB flash drive device 202 may delete the contents of the command entry 412. Similarly, upon completion of the reception of the data from the addressed portion of the storage media 204 of the USB flash drive device 202, the USB host device 250 may delete the contents of the corresponding command entry in the host command table 272. The previously occupied command entry 412 in the device command table 222, and the corresponding command entry in the host command table 272, are then available for use by the USB flash drive device 202 and USB host device 250, respectively, in storing command information for a new access to the USB flash drive device 202.

As shown in FIG. 4, a command entry 402, 412 of the USB device command table 400 may also comprise a command exec state field 407, 417 used to track the execution state of the associated command 406, 416, and may be stored, for example, as an unsigned integer or collection of bits suitable to represent one of a number of states of execution of the requested command. The USB flash drive device 202 may use the command exec state field 407, 417 to track its progress in performing the associated command 406, 416 received from the USB host device 250.

For example, following receipt of a command from the USB host device 250 and storage of received parameter values in the command identifier field 404, the command field 406, and the address field 408 of an unused command entry of device command table 400, the USB flash drive device 202 may set the command exec state field 407, 417 of a command entry 402, 412 to a value representing "RECEIVED." If the associated command field 406, 416 indicates that the received command is for a "write" access, when the portion of non-volatile memory addressed is available for access, and erasure of the addressed portion of non-volatile memory must be performed, the value of the command exec state field 407, 417 may then be set to indicate a value representing "ERASING BLOCK." Later, when erasure of the affected block is complete, the USB flash drive device 222 may set the value of the command exec state field 407, 417 set to indicate a value representing "READY FOR DATA." After the USB flash drive device 202 receives the data to be written from the USB host device 250 and commences writing to the addressed portion of non-volatile memory, the command exec state field 407, 417 may be set to indicate a value representing "WRITING DATA."

For a "read" access, when the addressed portion of non-volatile memory is available for access and the requested data from the addressed portion of non-volatile memory is available, the value of the command exec state field 407, 417 may be set to indicate a value representing "DATA READY." Then, after the USB flash drive device 202 has transmitted all of the data from addressed portion to the USB host device 250 and the command associated with the command entry 402, 412 is completed, the USB flash drive device 202 may set the command exec state field 407, 417 to a value representing "COMPLETE." An entry marked as "COMPLETED" may then be reused for a later received command.

Although only six representative command execution states have been described above, this is again for reasons of clarity, as a different number, or a different set of command execution states may be employed without departing from the spirit and scope of the present invention. It should again be noted that the command execution states tracked in the USB device command table 222 of the USB flash drive device 202 may, but need not be, the same as those used by the USB host device 250 and tracked in the USB host command table 272, which was described above with respect to the USB host command table 300 of FIG. 3. It should also be noted that the device command table 400 of FIG. 4 need not be arranged in memory as shown, but may be implemented out of multiple smaller tables or equivalent representations of similar data, without departing from the spirit and scope of the present invention.

Due to the length of time needed to erase a block of flash non-volatile memory, command information from additional command messages may be received and stored in the device command table 222 while the erasure of the block containing the portion of the storage media 204 addressed by the address field 408 is occurring.

When the media controller 220 and/or USB device controller 230 determines that the "write" access identified in the command field 406 of command entry 402 is able to be performed, the media controller 220 and/or the USB device controller 230 may send an indication to the USB host device 250 that the USB flash drive device 202 is ready to perform the "write" access of command entry 402 by transmitting, among other information, the command identifier 404 uniquely associated with the command entry 402 containing the "write" access of command field 406. The USB host device 250, upon receiving the "ready" indication from the USB flash drive device 202, may then transmit to the USB flash drive device 202, via USB link 240, the data to be written to a portion of the storage media 204. The location of the portion of the storage media 204 to be written is identified by the address field 408 of the command entry 402 of the device command table 400, also shown in FIG. 2 as device command table 222, and is also identified by the address field of the corresponding command entry of host command table 272. As discussed above, in one representative embodiment of the present invention, the data to be transmitted to the USB flash drive device 202 and to be written into the identified portion of the storage media 204 is taken from the data/link to data field of the corresponding command entry. That is, from the data/link to data field of the command entry in the host command table 272 having a command identifier field matching that contained in the command identifier field 404 of command entry 402 of the host command table 272. In other representative embodiments, the data to be transmitted to the USB flash drive device 202 and to be written into the identified portion of the storage media 204 is taken from the area of host memory 265 identified by the contents of the data/link to data field of the corresponding command entry.

Upon completion of the transmission of the data to the USB flash drive device 202 and the writing of the data to the identified portion of the storage media 204, the USB flash drive device 202 may send an indication of completion of the "write" access to the USB host device 250, and may include the command identifier uniquely associated with the command entry 402. The USB flash drive device 202 may then delete the contents of the command entry 402. In response to receiving the indication of completion of the writing of the data to the addressed portion of the storage media 204 of the USB flash drive device 202, the USB host device 250 may delete command entry in the host command table 272 having a command identifier field matching the command identifier received from the USB flash drive device 202.

Figure 5:
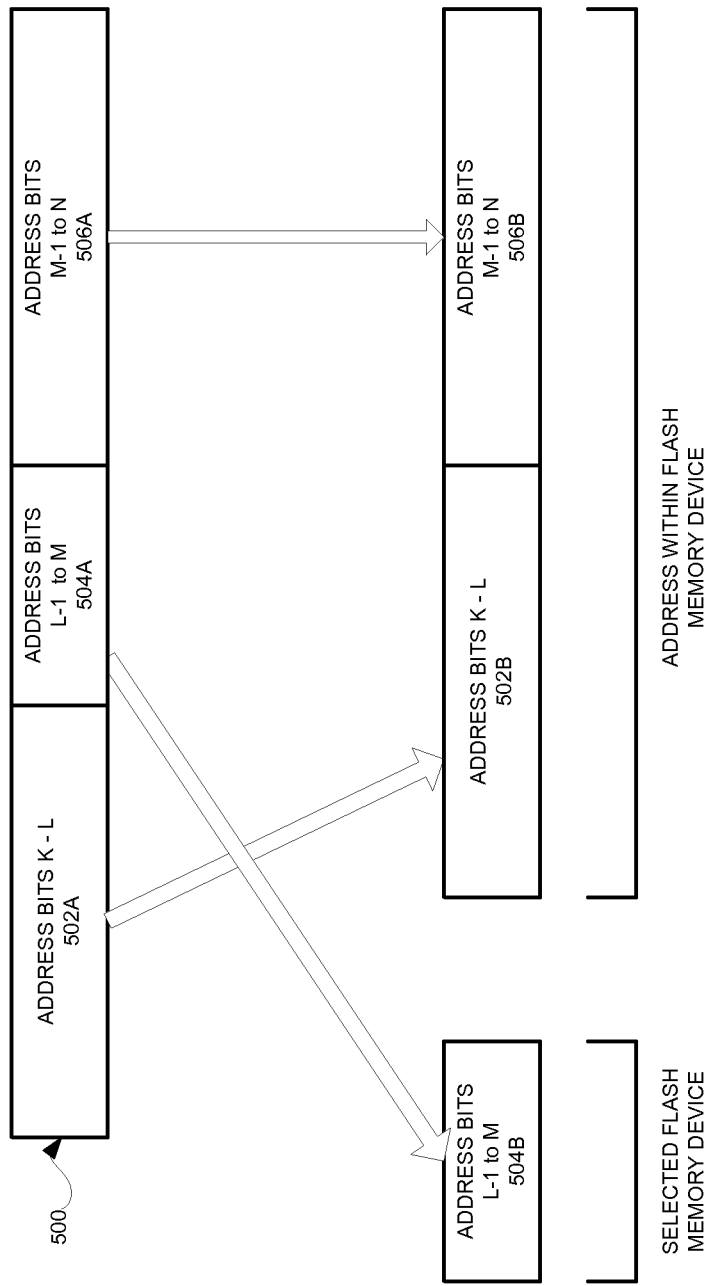
FIG. 5 is a block diagram illustrating an exemplary hashing or mapping operation for distributing accesses across flash memory blocks of the storage media of a USB flash drive device such as the storage media of the USB flash drive device of FIG. 2, in accordance with a representative embodiment of the present invention.

FIG. 5 is a block diagram illustrating an exemplary hashing or mapping operation for distributing accesses across flash memory blocks of the storage media of a USB flash drive device such as the storage media 204 of the USB flash drive device 202 of FIG. 2, in accordance with a representative embodiment of the present invention. As illustrated in FIG. 2 and previously discussed, the address space of a flash memory device such as, for example, the flash memory devices A 206 and B 212, is normally read and written in units of a "page," but can be erased only in units of a "block," which consists of multiple "pages." It is common for reads and writes to a USB flash drive device to involve reading or writing a number of pages of flash memory. If the amount of flash memory to be read or written exceeds the size of a memory block, the read or write will span across multiple blocks of the flash memory device. If the access to the flash memory device writes to the flash memory device, each crossing of a block boundary into a new block incurs a delay while the new block to be written into is erased.

As can be seen from the illustration of FIG. 5, a memory address 500 used to identify a location in storage media such as the storage media 204 of the USB flash memory device 202 of FIG. 2 may be of length K−N+1 bits. In some representative embodiments of the present invention, the memory address 500 may be partitioned into multiple portions. The illustrations of FIG. 5 shows memory address 500 partitioned into three portions containing address bits K to L 502A, address bits L−1 to M 504A, and address bits M−1 to N 506A, where K, L, M, and N are integers identifying a position of an address bit in the memory address 500, K being the most significant address bit and N being the least significant address bit. The actual values of K, L, M, and N, and hence the size of each portion of the memory address 500 depend, for example, upon the size and organization of the storage media of the USB flash drive device 202 and the size and organization of each of the flash memory devices used in the storage media 204 of the USB flash memory device 202.

In a representative embodiment of the present invention, the partitioning of the as shown in FIG. 5 spreads accesses to the storage media 204 of a flash drive device 202 across the blocks of the component flash memory devices of the flash drive device 202, shown in FIG. 2 as the blocks of the flash memory devices A 206 and B 212, helping to avoid consecutive accesses to the same blocks of the storage media 204. That is, the hashing or mapping of address information helps to avoid a later access to a block of storage media 204 that is already busy performing an erase operation triggered by an earlier access to the same block of a flash memory device of the storage media 204.

Figure 6A:
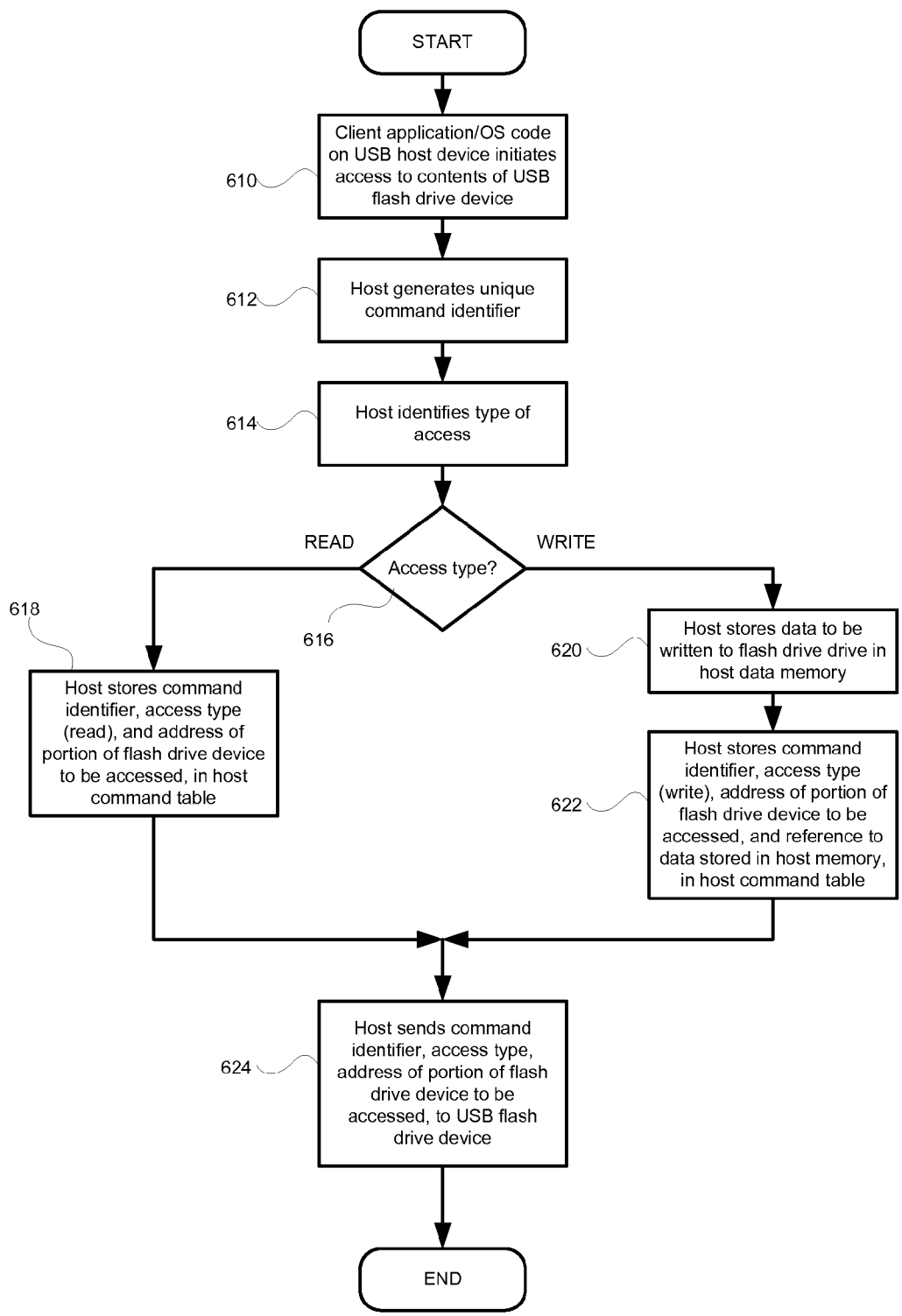
FIG. 6A is a flowchart illustrating actions of an exemplary method of operating a USB Host Device, such as the USB Host Device of FIG. 2, to enable the Host Device to initiate efficient access to the flash memory devices in a USB flash drive such as the USB flash drive device of FIG. 2, in accordance with a representative embodiment of the present invention.

FIG. 6A is a flowchart illustrating actions of an exemplary method of operating a USB Host Device, such as the USB Host Device 250 of FIG. 2, to enable the Host Device to initiate efficient access to the flash memory devices in a USB flash drive such as the USB flash drive device 202 of FIG. 2, in accordance with a representative embodiment of the present invention. The following description of FIG. 6A makes references to the elements of FIG. 2 and FIG. 3. The activity of FIG. 6A begins at block 610, at which point a client application or operating system, such as the client application 290 or OS 280 of USB host device 250 of FIG. 2 initiates access to the contents of a USB flash drive device such as the USB flash drive device 202 of FIG. 2. The USB host device 250 then, at block 612, generates a unique command identifier, and at block 614 identifies the type of the access to be performed upon the USB flash drive device 202. At block 616, the USB host device 250 determines whether the type of the access is "read" or "write, and if a "read", continues on to block 618. At block 618, the USB host device 250 stores the command identifier, the access type ("read"), and the address of the portion of the USB flash drive device 202 to be accessed, into a unused command entry in a host command table such as the command identifier fields 304, 314, the command fields 306, 316, and the address fields 308, 318, respectively, of command entry 302 of host command table 300 of FIG. 3. The USB host device 250 then proceeds to block 624, where the USB host device 250 then sends command information comprising the command identifier, the access type, and the address of portion of the flash drive device 202 to be accessed, to the USB flash drive device 202.

If, at block 616, the USB host device 250 determines that the type of the access is "write," the USB host device 250 continues on to block 620, at which the USB host device 250 stores the data to be written to the storage media 204 of the USB flash drive device 202 into host data memory such as the host data storage 276 of FIG. 2. Then, at block 622, the USB host device 250 stores the command identifier, the access type ("write"), the address of the portion of the USB flash drive device 202 to be accessed, and the location in the host data storage 276 into an unused command entry in the command identifier fields 304, 314, the command fields 306, 316, the address fields 308, 318, and the data/link to data field 310, respectively, of command entry 302 of host command table 300 of FIG. 3. The method then proceeds to block 624, where the USB host device 250 then sends command information comprising the command identifier, the access type, and the address of the portion of flash drive device 202 to be accessed, to the USB flash drive device 202 via the USB link 240.

Figure 6B:
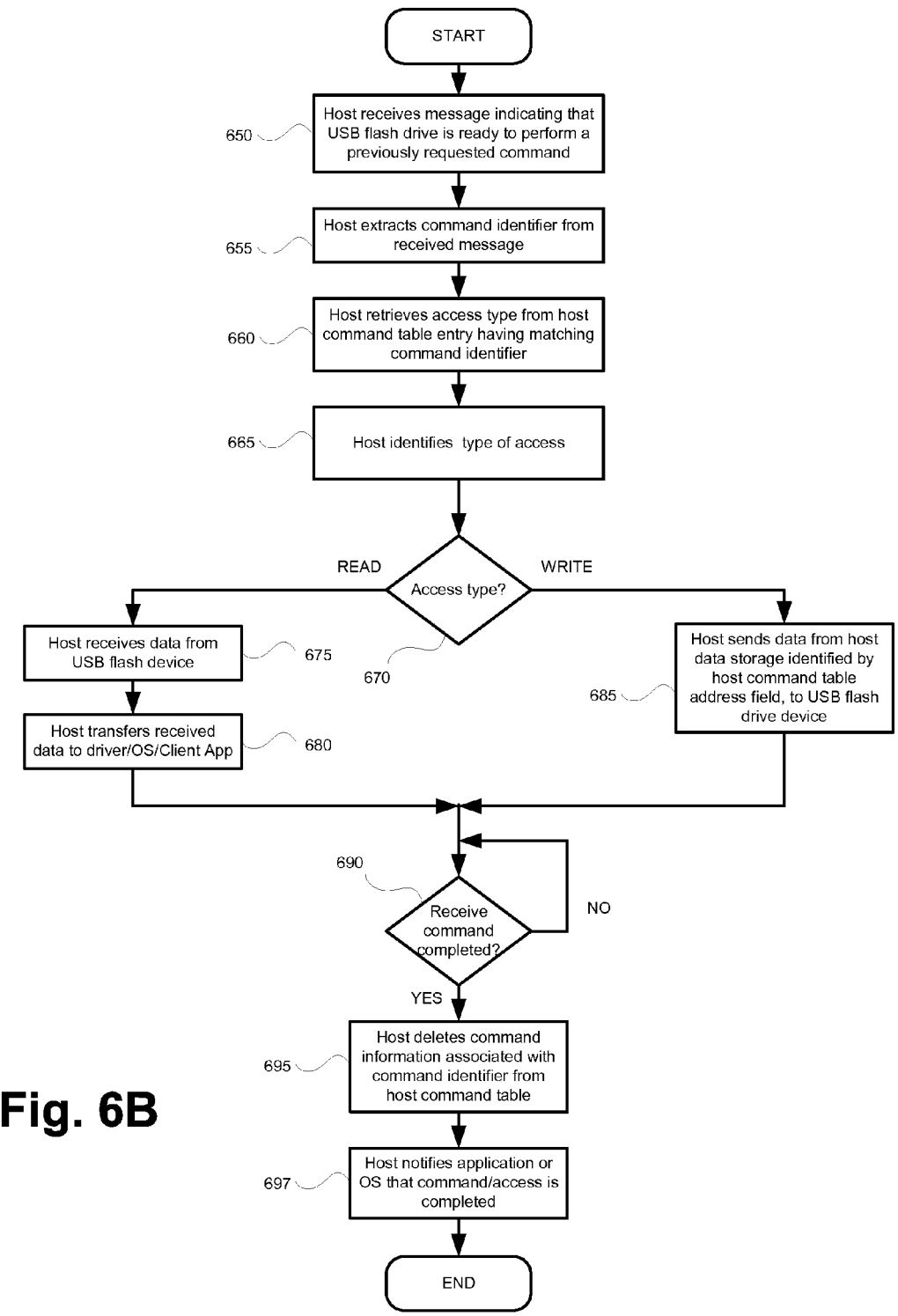
FIG. 6B is a flowchart illustrating actions of an exemplary method of operating a USB Host Device, such as the USB Host Device of FIG. 2, to enable the USB Host Device to complete an access initiated as described above with respect to FIG. 6A, in order to efficiently access the flash memory devices in a USB flash drive such as the USB flash drive device of FIG. 2, in accordance with a representative embodiment of the present invention.

FIG. 6B is a flowchart illustrating actions of an exemplary method of operating a USB Host Device, such as the USB Host Device 250 of FIG. 2, to enable the USB Host Device to complete an access initiated as described above with respect to FIG. 6A, in order to efficiently access the flash memory devices in a USB flash drive such as the USB flash drive device 202 of FIG. 2, in accordance with a representative embodiment of the present invention. The following description of FIG. 6B makes references to the elements of FIG. 2 and FIG. 3. The activity of FIG. 6B begins at block 650, at which point a client application or operating system, such as the client application 290 or OS 280 of USB host device 250 of FIG. 2 begins processing a response received to a previously initiated access to to the contents of a USB flash drive device such as the USB flash drive device 202 of FIG. 2. At block 650, the USB host device 250 receives a message indicating that the USB flash drive device 202 is ready to perform a previously requested command. Next, at block 655, the USB host device 250 extracts the command identifier from received message. At block 660, the USB host device 250 retrieves access type information from the command field of the command entry of the host command table 272 entry having a matching command identifier, such as the command field 306 of command entry 302 of the host command table 300 of FIG. 3.

Next, at block 665, the USB host device 250 identifies the type of the access that was initiated upon the USB flash drive device 202 for the command that is now ready. This may be done by finding the command entry in the host command table 272 having a command identifier field that matches the command identifier extracted from the received message at block 655. At block 670, the USB host device 250 determines whether the type of the access is "read" or "write, and if a "read", continues on to block 675, where the USB host device 250 then receives data from USB flash drive device 202. The method then proceeds to block 680, where the USB host device 250 transfers the received data to the device driver 270, the OS 280, and/or the client application 290 of the USB host device 250. Next, at block 690, the USB host device 250 determines whether a message indicating that the command accessing the USB flash drive device 202 is complete has been received by the USB host device 250. If not, the USB host device 250 waits for a message having such an indication. While shown in FIG. 6B as a loop, the action of block 690 action may, for example, simply suspend a thread in a multitasking environment until the condition of block 690 is met. If a message indicating that the command accessing the USB flash drive device 202 is complete then, at block 695, the USB host device 250 deletes the command information associated with the command identifier extracted at block 655 from the host command table. At block 697, the USB Host device may notify the OS 280 or application 290 that the requested command/access is completed.

If, at block 670, the type of access is determined to be a "write," the method proceeds to block 685, where the USB host device 250 sends data from the host data storage 276 identified by the address field 310 of the command entry 302, to USB flash drive device 202. The method then proceeds to block 690, as described above.

Figure 7A:
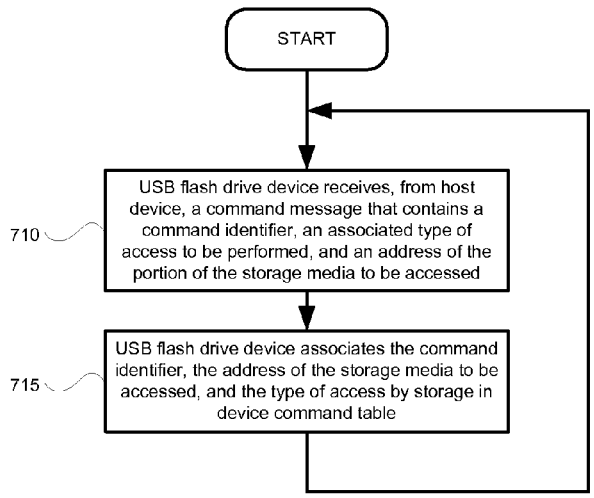
FIG. 7A is a flowchart illustrating actions of an exemplary method of processing command messages for accesses to a USB flash drive device, such as the USB flash drive device of FIG. 2, to enable the USB host device of FIG. 2 to efficiently access the storage media in the USB flash drive device, in accordance with a representative embodiment of the present invention.

FIG. 7A is a flowchart illustrating actions of an exemplary method of processing command messages for accesses to a USB flash drive device, such as the USB flash drive device 202 of FIG. 2, to enable the USB host device 250 of FIG. 2 to efficiently access the storage media 204 in the USB flash drive device 202, in accordance with a representative embodiment of the present invention. The following description of FIG. 7A makes references to the elements of FIG. 2 and FIG. 4. The activity of FIG. 7A begins at block 710, following the interconnection of an electrical connector of the USB flash drive device 202 with a mating electrical connector of a USB port on the USB host device 250. This interconnection of the USB flash drive device 202 with the USB host device 250 brings about a number of actions by the USB host device 250 and the USB flash drive device 202 that are described in the relevant portions of the USB 3.0 protocol specification, identified above, and which are not specific to the actions of FIG. 7A, and therefore will not be discussed here. It should be noted that although separated from the actions of FIG. 7B, for reasons of clarity, the actions of FIGS. 7A and 7B may take place concurrently within the USB flash drive device 202.

At some point in time following the interconnection of the USB flash drive device 202 and the USB host device 250, the USB flash drive device 202 receives, from the USB host device 250, a command message that contains command information comprising a command identifier, an associated type of access to be performed, and an address of the portion of the storage media 204 of the USB flash drive device 202 to be accessed. After receiving the command information in block 710, the USB flash drive device 202 then, at block 715, associates the command identifier, the address of the storage media to be accessed, and the type of access, by storage in the command identifier field, command field, and address field of an unused command entry of the device command table 222, such as the command identifier field 404, the command field 406, and the address field 408, respectively, of command entry 402 of FIG. 4. The USB flash drive device 202 then returns to the action of block 710, to permit it to continue to receive additional command messages for further accesses to the USB flash drive device 202 by the USB host device 250. Although not shown, upon receipt of a command message from the USB host device 250, the USB flash drive device 202 of a representative embodiment of the present invention may check whether any unused command entries remain in the device command table 222, and may indicate the lack of space to the USB host device 250.

Figure 7B:
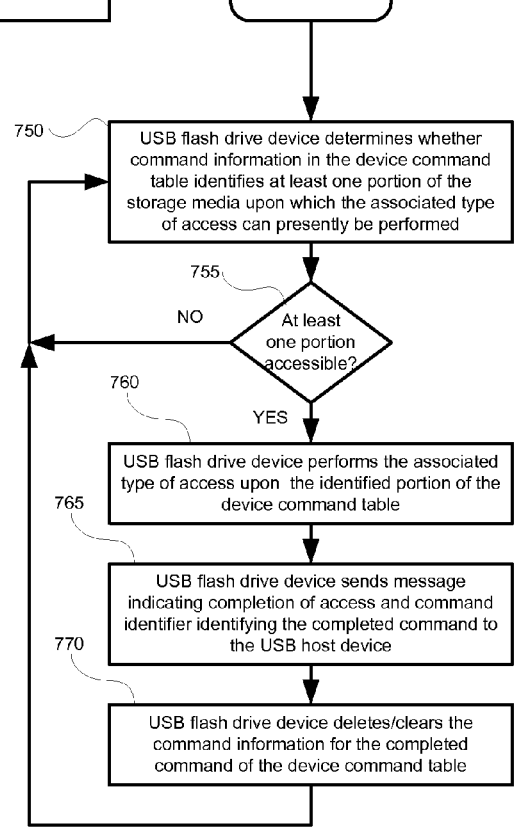
FIG. 7B is a flowchart illustrating actions of an exemplary method of processing pending accesses to the storage media of a USB flash drive device, such as the storage media of the USB flash drive device of FIG. 2, to enable a USB host device such as the USB host device of FIG. 2 to efficiently access the storage media in the USB flash drive device, in accordance with a representative embodiment of the present invention.

FIG. 7B is a flowchart illustrating the actions of an exemplary method of processing pending accesses to the storage media of a USB flash drive device, such as the storage media 204 of the USB flash drive device 202 of FIG. 2, to enable a USB host device such as the USB host device 250 of FIG. 2 to efficiently access the storage media 204 in the USB flash drive device 202, in accordance with a representative embodiment of the present invention. The following description of FIG. 7A makes references to the elements of FIG. 2 and FIG. 4. The activity of FIG. 7B begins at block 750, following the interconnection of an electrical connector of the USB flash drive device 202 with a mating electrical connector of a USB port on the USB host device 250. As previously discussed, this interconnection of the USB flash drive device 202 with the USB host device 250 brings about a number of actions by the USB host device 250 and USB flash drive device 202 that are described in the relevant portions of the USB 3.0 protocol specification, identified above, which are not specific to the actions of FIG. 7B, and therefore will not be discussed here. Further, it should again be noted that although separated from the actions of FIG. 7A, for reasons of clarity, the actions of FIGS. 7A and 7B may take place concurrently within the USB flash drive device 202.

At block 750, the USB flash drive device 202 determines whether command information in any command entry of the device command table 222 identifies at least one portion of the storage media 204 upon which the associated type of access can presently be performed. In one representative embodiment of the present invention, the media controller 220 of FIG. 2 may repeatedly scan the contents of the device command table 222, to determine whether the portion of the storage media 204 identified by any of the occupied command entries of the device command table 222 is presently in an operating condition to permit the type of access identified in the associated command field, such as the command field 406 of command entry 402, shown in FIG. 4. If an access is able to be performed on a portion of the storage media 204 identified in a command entry of the device command table 222 then, at block 755, the method of FIG. 7B proceeds to block 760, where the method of FIG. 7B has the USB flash drive device 202 perform the associated type of access upon the portion of the storage media 204 was found in condition to perform the desired type of access. In the method of FIG. 7B, the USB flash drive device 202, following completion of the access to the storage media 204 then, at block 765, sends to the USB host device 250 a message indicating completion of the access to the storage media 204, along with the command identifier identifying the completed command entry in the device command table 222. The USB flash drive device 202 then, at block 770, deletes/clears the command information for the completed command of the device command table 222, and proceeds to block 750 to continue to determine whether any accesses to the storage media 204 are able to be performed.

Aspects of a representative embodiment of the present invention may be seen in a data storage device comprising at least one solid state non-volatile memory comprising a plurality of readable and writable first portions each having a plurality of addressable memory locations, and at least one controller operably coupled to the memory and to interface circuitry supporting communication with a host device. The at least one controller may be operable to, at least, receive, from the host device via the interface circuitry, a command message comprising command information identifying an address of a first portion of the memory to be accessed and an associated type of access, and store the command information in the data storage device. The data storage device may be arranged to hold command information for a plurality of command messages.

In a representative embodiment of the present invention, the at least one controller may also be operable to determine whether the stored command information identifies at least one first portion of the memory upon which the associated type of access can presently be performed. The at least one controller may perform the associated type of access upon the at least one first portion of the memory, if it is determined that the stored command information identifies at least one first portion of the memory upon which the associated type of access can presently be performed. Upon completion of the associated type of access upon the at least one first portion, the controller of a representative embodiment of the present invention may send a status message to the host device via the interface circuitry, and delete, from the stored command information, the command information identifying the at least one first portion upon which the associated type of access was performed. In a representative embodiment of the present invention, the data storage device may not comprise additional memory of sufficient size for temporary storage of the entire at least one first portion prior to being written to the memory.

In some representative embodiments of the present invention, the non-volatile memory may comprise flash non-volatile memory. The first portion of the at least one memory may be required to be in an erased condition before data is written to the first portion, and the first portion may only be erasable as part of erasure of a second portion comprising a plurality of the first portions. The storage device may comprise a first electrical connector for mating electrically with a second electrical connector on the host device. The command information of a representative embodiment of the present invention may comprise a command identifier assigned by the host device to uniquely identify command information of a single command message in the data storage device.

In a representative embodiment of the present invention, performing the associated type of access upon the at least one portion of the memory may comprise, if the associated type of access is a read access, sending contents of the at least one first portion to the host device via the interface circuitry. If the associated type of access is a write access, performing the associated type of access may comprise sending, to the host device via the interface circuitry, a message signifying that the data storage device is ready to write data to the at least one first portion, receiving, from the host device via the interface circuitry, data to be written to the at least one first portion, and writing the received data to the at least one first portion. The communication may be according to the Universal Serial Bus (USB) 3.0 standard.

Further aspects of a representative embodiment of the present invention may be found in a method of operating a data storage device supporting communication with a host device. Such a method may comprise receiving, from the host device, a command message comprising command information identifying an address of a first portion of at least one solid state non-volatile memory to be accessed and an associated type of access. The memory may comprise a plurality of readable and writable first portions each having a plurality of addressable memory locations. Such a method may also comprise storing the command information in the data storage device. The data storage device may be arranged to hold command information for a plurality of command messages. The method may further comprise determining whether the stored command information identifies at least one first portion of the memory upon which the associated type of access can presently be performed.

In addition, such a method may comprise performing the associated type of access upon the at least one first portion of the memory, if it is determined that the stored command information identifies at least one first portion of the memory upon which the associated type of access can presently be performed. Upon completion of the associated type of access upon the at least one first portion, the method may send a status message to the host device, and delete the stored command information identifying the at least one first portion upon which the associated type of access was performed. The data storage device may not comprise additional memory of sufficient size for temporary storage of the entire at least one first portion prior to being written to the memory.

In a representative embodiment of the present invention, the non-volatile memory may comprise flash non-volatile memory. The first portion of the at least one memory may be required to be in an erased condition before data is written. The first portion may only be erasable as part of erasure of a second portion comprising a plurality of the first portions, and the data storage device may comprise a first electrical connector for mating electrically with a second electrical connector on the host device. The command information may comprise a command identifier assigned by the host device. The command identifier may uniquely identify command information of a single command message in the data storage device.

A representative embodiment of the present invention may perform the associated type of access upon the at least one first portion of the memory by sending contents of the at least one first portion to the host device, if the associated type of access is a read access. If the associated type of access is a write access, the method may send, to the host device, a message signifying that the data storage device is ready to write data to the at least one first portion, receive, from the host device, data to be written to the at least one first portion, and write the received data to the at least one first portion. The communication may be according to the Universal Serial Bus (USB) 3.0 standard.

Additional aspects of the present invention may be observed in one or more circuits for a data storage device. The one or more circuits may comprise at least one controller operably coupled to at least one solid state non-volatile memory comprising a plurality of readable and writable first portions each having a plurality of addressable memory locations. The at least one controller may be operably coupled to interface circuitry supporting communication with a host device.

In a representative embodiment of the present invention, the at least one controller may be operable to, at least, store in the data storage device command information from a plurality of command messages received from the host device, and the command information may identify an address of a first portion of the memory to be accessed and an associated type of access. The controller may also be operable to perform an associated type of access upon at least one first portion of the memory identified in the stored command information when it is determined that the associated type of access can be performed upon the at least one first portion. Upon completion of the associated type of access, the at least one controller may delete the stored command information identifying the at least one first portion upon which the associated type of access was performed. The data storage device may not comprise additional memory of sufficient size to temporarily store data for the at least one first portion.

In a representative embodiment of the present invention, performing the associated type of access upon the at least one first portion of the memory may comprise sending contents of the at least one first portion to the host device, if the associated type of access is a read access. If the associated type of access is a write access, the performing may comprise sending, to the host device, a message signifying that the data storage device is ready to write data to the at least one first portion, receiving, from the host device, data to be written to the at least one first portion, and writing the received data to the at least one first portion. The first portion may only be erasable as part of erasure of a second portion comprising a plurality of the first portions, and the command information may comprise a command identifier assigned by the host device to uniquely identify command information of a single command message in the data storage device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A data storage device comprising:
at least one solid state non-volatile memory comprising a plurality of readable and writable portions each having a plurality of addressable memory locations; and
at least one controller operably coupled to the memory and to interface circuitry supporting communication with a host device, wherein the at least one controller is configured to implement:
receiving from the host device via the interface circuitry, a command message, wherein the command message comprises command information identifying an address of a first portion of the memory to be accessed and an associated type of memory access;
storing the command information in the data storage device; and
repeating said receiving and said storing a plurality of times, thereby generating a plurality of stored command messages with associated respective first portions of memory to be accessed; and
wherein the at least one controller is further configured to implement:
determining whether at least one stored command message of the plurality of stored command messages identifies at least one respective first portion of the memory upon which the associated type of memory access can presently be performed;
performing the associated type of memory access upon the at least one respective first portion of the memory, in response to determining that the at least one stored command message identifies at least one respective first portion of the memory upon which the associated type of memory access can presently be performed;
upon completion of the associated type of memory access upon the at least one respective first portion, sending a status message to the host device via the interface circuitry, and deleting, from the plurality of stored command messages, the at least one command message identifying the at least one respective first portion upon which the associated type of memory access was performed; and
repeating said determining, said performing, and said sending for each command message of the plurality of command messages;

wherein at least a portion of said receiving and said storing is performed concurrently with said determining, said performing, and said sending; and wherein the data storage device does not comprise additional memory of sufficient size for temporary storage of the entire at least one first respective portion prior to being written to the memory.

2. The device of claim 1, wherein the non-volatile memory comprises flash non-volatile memory.

3. The device of claim 1, wherein the first portion of the memory must be in an erased condition before data is written to the first portion.

4. The device of claim 1, wherein the first portion is only erasable as part of erasure of a second portion comprising a plurality of the first portions.

5. The device of claim 1, wherein the storage device comprises a first electrical connector for mating electrically with a second electrical connector on the host device.

6. The device of claim 1, wherein the command information comprises a command identifier assigned by the host device to uniquely identify command information of a single command message in the data storage device.

7. The device of claim 1, wherein performing the associated type of memory access upon the at least one portion of the memory comprises:
  if the associated type of memory access is a read access, sending contents of the at least one respective first portion to the host device via the interface circuitry; and
  if the associated type of memory access is a write access:
    sending, to the host device via the interface circuitry, a message signifying that the data storage device is ready to write data to the at least one respective first portion,
    receiving, from the host device via the interface circuitry, data to be written to the at least one respective first portion, and
    writing the received data to the at least one respective first portion.

8. The device of claim 1, wherein the communication is according to the Universal Serial Bus (USB) 3.0 standard.

9. A method of operating a data storage device supporting communication with a host device, the method comprising:
  receiving, from the host device, a command message comprising command information identifying an address of a first portion of at least one solid state non-volatile memory to be accessed and an associated type of memory access, the memory comprising a plurality of readable and writable first portions each having a plurality of addressable memory locations;
  storing the command information in the data storage device;
  repeating said receiving and said storing a plurality of times, thereby generating a plurality of stored command messages with associated respective first portions of memory to be accessed;
  determining whether at least one stored command message of the plurality of stored command messages identifies at least one respective first portion of the memory upon which the associated type of memory access can presently be performed;
  performing the associated type of memory access upon the at least one respective first portion of the memory, in response to determining that the at least one stored command message identifies at least one respective first portion of the memory upon which the associated type of memory access can presently be performed;
  upon completion of the associated type of memory access upon the at least one respective first portion, sending a status message to the host device via the interface circuitry, and deleting, from the plurality of stored command messages, the at least one command message identifying the at least one respective first portion upon which the associated type of memory access was performed; and
  repeating said determining, said performing, and said sending for each command message of the plurality of command messages;
  wherein at least a portion of said receiving and said storing is performed concurrently with said determining, said performing, and said sending; and
  wherein the data storage device does not comprise additional memory of sufficient size for temporary storage of the entire at least one respective first portion prior to being written to the memory.

10. The method of claim 9, wherein the non-volatile memory comprises flash non-volatile memory.

11. The method of claim 9, wherein the first portion of the memory must be in an erased condition before data is written.

12. The method of claim 9, wherein the first portion is only erasable as part of erasure of a second portion comprising a plurality of the first portions.

13. The method of claim 9, wherein the data storage device comprises a first electrical connector for mating electrically with a second electrical connector on the host device.

14. The method of claim 9, wherein the command information comprises a command identifier assigned by the host device, the command identifier uniquely identifying command information of a single command message in the data storage device.

15. The method of claim 9, wherein performing the associated type of memory access upon the at least one respective first portion of the memory comprises:
  if the associated type of memory access is a read access, sending contents of the at least one respective first portion to the host device; and
  if the associated type of memory access is a write access:
    sending, to the host device, a message signifying that the data storage device is ready to write data to the at least one respective first portion,
    receiving, from the host device, data to be written to the at least one respective first portion, and
    writing the received data to the at least one respective first portion.

16. The method of claim 9, where communication is according to the Universal Serial Bus (USB) 3.0 standard.

17. One or more circuits for a data storage device, the one or more circuits comprising:
  at least one controller operably coupled to at least one solid state non-volatile memory comprising a plurality of readable and writable first portions each having a plurality of addressable memory locations, and to interface circuitry supporting communication with a host device, wherein the at least one controller is configured to implement:
    receiving from the host device via the interface circuitry, a command message, wherein the command message comprises command information identifying an address of a first portion of the memory to be accessed and an associated type of memory access;
    storing command information in the data storage device; and
    repeating said receiving and said storing a plurality of times, thereby generating a plurality of stored command messages with associated respective first portions of memory to be accessed; and wherein the at least one controller is further configured to implement:

performing the associated type of memory access upon the at least one first portion of the memory, in response to determining that the at least one stored command message identifies at least one respective first portion of the memory upon which the associated type of memory access can presently be performed;

upon completion of the associated type of memory access upon the at least one respective first portion, sending a status message to the host device via the interface circuitry, and deleting, from the plurality of stored command messages, the at least one command message identifying the at least one respective first portion upon which the associated type of memory access was performed; and repeating said determining, said performing, and said sending for each command message of the plurality of command messages;

wherein at least a portion of said receiving and said storing is performed concurrently with said determining, said performing, and said sending; and wherein the data storage device does not comprise additional memory of sufficient size to temporarily store data for the at least one respective first portion.

18. The one or more circuits of claim 17, wherein performing the associated type of memory access upon the at least one respective first portion of the memory comprises:

if the associated type of memory access is a read access, sending contents of the at least one respective first portion to the host device; and if the associated type of memory access is a write access:
sending, to the host device, a message signifying that the data storage device is ready to write data to the at least one respective first portion,
receiving, from the host device, data to be written to the at least one respective first portion, and
writing the received data to the at least one respective first portion.

19. The one or more circuits of claim 17, wherein the first portion is only erasable as part of erasure of a second portion comprising a plurality of the first portions.

20. The one or more circuits of claim 17, wherein the command information comprises a command identifier assigned by the host device to uniquely identify command information of a single command message in the data storage device.

* * * * *